Oct. 22, 1963 W. BUCHHOLZ ET AL 3,108,256

LOGICAL CLEARING OF MEMORY DEVICES

Filed Dec. 30, 1958 6 Sheets-Sheet 2

Oct. 22, 1963 W. BUCHHOLZ ETAL 3,108,256

LOGICAL CLEARING OF MEMORY DEVICES

Filed Dec. 30, 1958 6 Sheets-Sheet 3

United States Patent Office 3,108,256

Patented Oct. 22, 1963

3,108,256

LOGICAL CLEARING OF MEMORY DEVICES

Werner Buchholz, Wappingers Falls, and Lawrence E. Kanter, Poughkeepsie, N.Y., assignors to International Business Machines Corporation, New York, N.Y., a corporation of New York Filed Dec. 30, 1958, Ser. No. 783,754

6 Claims. (Cl. 340—172.5)

This invention relates to information-handling systems generally, and more particularly to apparatus and methods for rapidly clearing a group of information registers in a memory device.

Information-handling systems, for example, data processing and storing systems, often need to employ large numbers of devices for storing or registering bits of information, and a problem encountered in such systems is that after information has been stored in the registers, occasions arise when it is desirable to clear rapidly a selected group or block of registers or even the entire memory. An illustrative occasion of this type is one in which the information stored in the selected block of registers has become obsolete. The number of registers in the block to be cleared may be so large that to clear them in the ordinary way, one by one, is so time-consuming as to be highly disadvantageous.

An object of the invention is to increase the speed and flexibility of operation of information-handling systems, particularly operations in connection with the clearing of groups of memory devices.

In a preferred embodiment of the invention, when it is desired to clear a selected block of registers, instead of accomplishing the clearing by a sequence of individual orders directed to the individual registers, the system employs an initial blanket order directed to the selected block of registers as a whole. That order, although it does not in fact physically clear those registers, causes the apparatus to perform substantially as if they were physically cleared.

Thus when the information contained in a block of registers is no longer needed and it is desired to re-use the registers, all the registers in the block may be simultaneously indicated as "Clear" and the system so conditioned that if an order is received to read information out of a register indicated as "Clear," the information will not be read out, even though the register may in fact still contain information. That is, the indication of a register as "Clear" is used herein to mean that the information in this register is not to be read out or used. The indication of a register as "Clear" may also be regarded as meaning that the content of the register is to be treated as comprising all "zeros" (in digital terminology) or whatever the code is for a clear condition, regardless of whether the content is actually all "zeros" or otherwise. The absence of an indication that a given register is "Clear" means that there is no prohibition in effect against reading out and using the actual content of the register. In other words, in accordance with the invention, the "Clear" indicating means "Don't Read" and the absence of the "Clear" indication or presence of a "May Read" indication makes reading permissible but says nothing about the actual content of the register.

The system is so conditioned that any attempt to read the information out of a "Clear" register results in actual, physical clearing of the register. Thus, as the registers in a block indicated as "Clear" are selected for further use they are physically cleared one at a time as needed so that it is not necessary to wait until all the registers in the block are physically clear before they may be used again.

Further in accordance with the invention, the indication of a register as "Clear" and the subsequent restoration of the register to normal use is effected by means of a single bit associated with the coding of each item of information that is stored, this extra bit being designated as the "Clear Memory" bit, or briefly, the "Clear" bit. This bit, which may be regarded as the Status Bit or more particularly as a Reading Status Bit, comprises an adjunct, for example, a prefix or suffix to the bits which make up the coded form of the stored information.

The invention is particularly applicable to memory organizations of the matrix type. These have the property of random access and may have the added property of destructive read-out. Access is random when the registers need not be operated upon in any predetermined fixed order. In destructive read-out, the act of reading information out of a register clears the register, and, if the information is wanted for later reference, it must be transferred elsewhere, as to a temporary register, and then put back into memory. Alternatively stated, if the register is to be cleared and new information substituted, reading the old information out automatically clears the register and thereupon new information may be put in. A random access memory with destructive readout is exemplified by a magnetic core matrix in which the cores store information by virtue of residual magnetism, of which one polarity may represent a binary "one" and the opposite polarity a binary "zero." The cores are considered to be normally in the "zero" state. A positive magnetizing pulse is used for writing a "one," driving the core to magnetic saturation in the positive direction. At the termination of the pulse the core becomes unsaturated but is left in the "one" state. To write a "zero" in memory, the core is prevented from being switched out of the "zero" state when the above-mentioned positive magnetizing pulse is applied, by means which may be termed an inhibit driver. Reading from memory is accomplished by applying a negative magnetizing pulse to the core. If the core to be read is in the "one" state, the pulse drives it to negative saturation, producing an output pulse in a sensing wire associated with the core. At the termination of the pulse the core is left unsaturated and in the "zero" state, thus in effect clearing the core. If the core to be read is initially in the "zero" state, the negative pulse leaves the core in the "zero" state. Thus, whether the core is originally in the "one" state or in the "zero" state, the process of reading the contents automatically clears the core.

A magnetic drum, on the other hand, exemplifies a type of memory which may be read without destroying the contained information. The information is stored by means of reversals in direction of magnetization. In the reading process, the passing of the drum under a reading head results in reading out the contents of the drum without destroying or altering the pattern of magnetization on the drum. When it is desired to substitute new information, the old information is destroyed while writing in the new information over the old, by well-known means.

While the use of status bits has been suggested in connection with a memory of the magnetic drum type, there have been various disadvantages, including the lack of ready adaptability to the simultaneous indication of a block of registers for clearing, which disadvantage stems from a lack of random access. Furthermore, two status bits have been required to control the clearing and reading of a single register in a drum type system.

While memories having the property of destructive read-out lend themselves to the physical clearing of registers one at a time as they are addressed, non-destructive memories with random access (such as those in matrix form) may be used if means are provided for erasing the information stored in a register whenever it is desired to put new information in place of old.

In the system of the present invention, blocks of registers in any desired number and in any desired portion of the memory may be indicated substantially simultaneously as "Clear," and only one status bit is required for each register to be cleared.

It will be noted that when a block of registers contain information that is no longer needed and it is desired to re-use the registers, it is advantageous that the machine not read out the undesired information or at least that it not pass such information to the arithmetic and logical units.

It is usual in operating a machine using a core type memory to employ a basic memory cycle having a read portion followed by a write portion. The same basic memory cycle is employed whether the operation to be performed is a read operation or a write operation.

In a normal read operation, during the read portion of the memory cycle, the information content of a selected register is transferred to a temporary storage register. The information in the temporary storage register is passed to a utilization device, for example, the arithmetic and logical unit of a computer as for use in calculation, and then, during the write portion of the memory cycle, the temporarily stored information is rewritten back into memory in the register where it was originally contained. In a write operation the information read out need not be transferred to a temporary storage register and is not written back into memory, but during the write portion of the memory cycle new information is written into the register in place of the old.

In accordance with the invention, the read operation is modified but no change is made in the write operation. While as before, in the read portion of the memory cycle the information content of the selected register is transferred to a temporary storage register, physically clearing the cores, in the modified read operation only zeros are transmitted to the arithmetic and logical unit. Furthermore, during the write portion of the memory cycle, in effect only zeros are written back into memory, leaving the selected register actually and physically cleared. Since the cores are now cleared, there is no need to maintain the status bit core in the state indicating a cleared register, for if access is now made to the register only zeros will be read out. This is a distinct advantage of the system of the present invention over any system which would require the maintaining of a status bit in a certain state until such later time as the register should be physically cleared.

The invention provides for substantially simultaneously setting into like state the status bits associated with all the registers in a block that is to be indicated as "Clear."

Thus, by means of the invention, registers in the memory organization, in large or small blocks, may be very rapidly made to appear clear to all intents and purposes when an attempt is made to read information out of them, while the actual clearing may proceed in one register at a time as orders are executed involving access to the respective registers. Without the invention, it would be necessary, in order to achieve an equivalent effect, to perform a separate write operation upon each register in the block to be cleared, writing all zeros into each register in place of the original contents of the respective register.

While either "zero" or "one" may be used to indicate a cleared status, a "zero" is preferred for this purpose because it facilitates the suppression of the actual information content of the register as well as the physical clearing. The selection of the particular blocks of registers to be indicated as "Clear" may be made by means of address codes, a suitable address register, and decoding means.

An example of a situation in which the invention is particularly advantageous is found in the operation known as "counting in memory." In this operation, a plurality of items are to be examined and counted according to a plurality of categories. Each item specifies the particular category to which it belongs and the items are received in random order of categories. Each category is preassigned to a register at a specific address in a block of registers in memory. Each item may, for example, comprise a punched card bearing the address in memory of the category to which the item belongs. The card is read by the data processing machine to determine the category. The sub-total of items already counted in that category is then read out of memory and transmitted to an adding unit where "one" is added to the count and the new sum is then written back into memory in the same memory register from which the sub-total was obtained. In cases where a large number of categories are employed occupying a large area of memory and particularly where many series of counts are to be made one after another, it is advantageous to provide for rapidly clearing the entire block of memory registers involved in the counting operation before starting a new count. In accordance with the invention, the entire block is effectively cleared by means of an instruction which may, for example, take the form of an operation code portion comprising a combination of binary digits standing for the operation "Clear memory," followed by an address portion comprising a combination of binary digits standing for the address of the particular portion of memory that is to be indicated as Clear.

Other features, objects and advantages will appear from the following more detailed description of an illustrative embodiment of the invention, which will now be given in conjunction with the accompanying drawings.

An illustrative form of the invention will be described in an embodiment which, among other uses, is suitable for use in memory systems of the general character described in the patent application of R. A. Gregory et al., Serial No. 592,545, filed June 20, 1956, now Patent No. 2,960,683, but it is of course to be understood that the invention in its broadest aspect is not limited to use with the system therein described.

The invention will first be described in general terms with reference to FIG. 1. Thereafter, the wiring scheme of the memory system will be described as shown in FIGS. 2–5. Finally, the invention will be described in more detail with reference to FIGS. 6 and 7.

Figure 1:
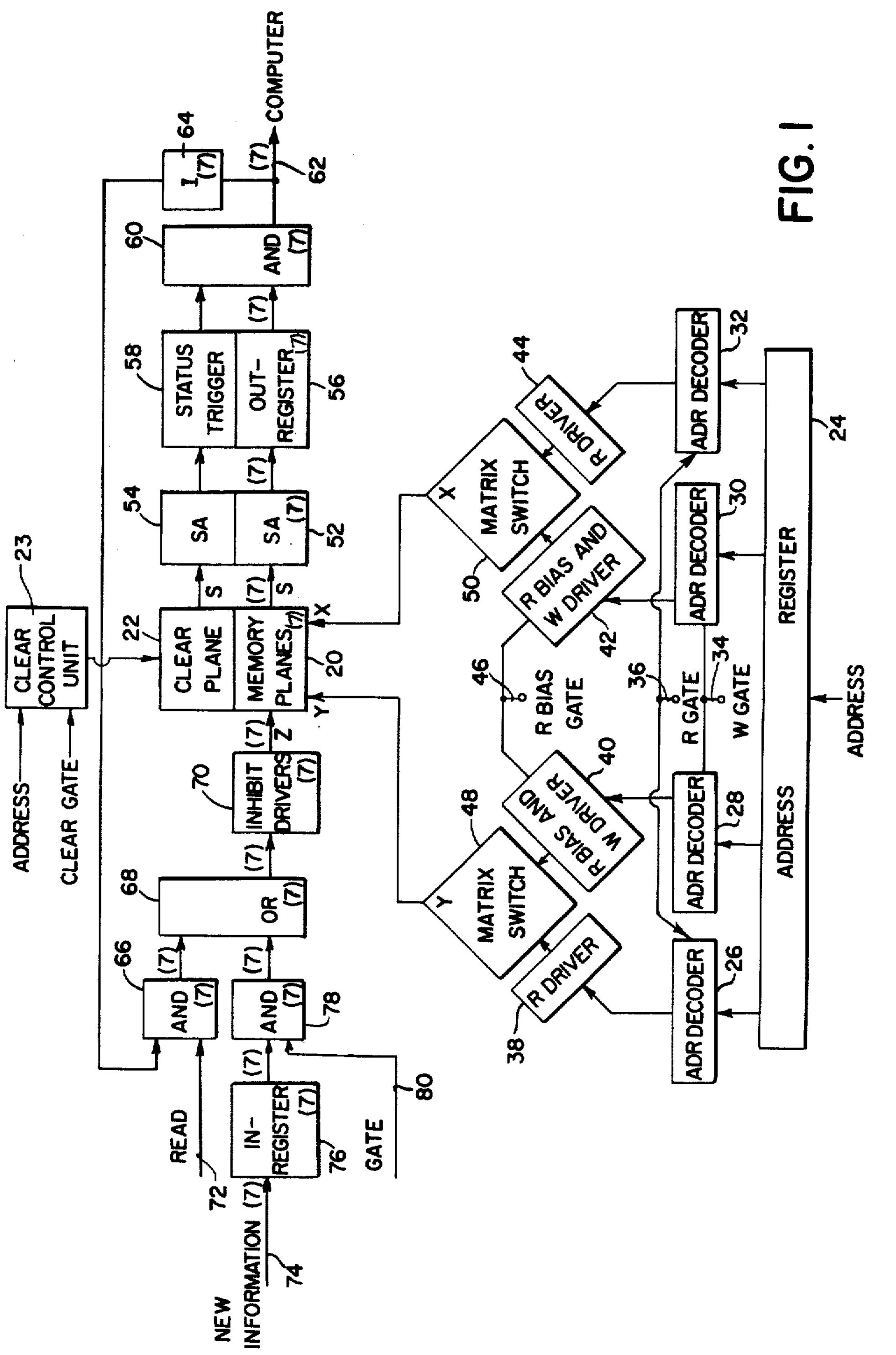
FIG. 1 is a general block schematic diagram of an information-handling system embodying the invention.

In the arrangement of FIG. 1, the invention is illustrated as applied to an information-handling system or data coordinator having a block 20 of seven memory core planes, each plane containing an array of magnetic cores in a square formation with 32 cores in a row and 32 rows, making a total of 1024 cores in each plane. The planes are assumed to be located in a stacked arrangement as in FIG. 2 so that there are 1024 vertical columns of seven cores each, constituting 1024 registers, each register capable of storing the seven binary digits of a seven-digit number, instruction, word, or the like. The contents of a register may be referred to generally as a "word" or "character" or "character of data" regardless of its specific meaning.

In accordance with the invention, there is added to the stack of seven core planes, which will be referred to briefly as "memory planes," an eighth core plane 22 which also contains an array of cores in a square formation and has in this illustrative embodiment one core in each of the 1024 columns determined by the cores in the seven memory planes. The core plane 22 is called the Clear plane and is under the control of a Clear control unit 23 which is shown in greater detail in FIG. 7.

For selecting any desired register from the 1024 registers so that digital information may be stored therein or read out therefrom, selecting means are provided comprising an address register 24, and address decoders 26, 28, 30, 32. A terminal 34 is provided for applying a Write Gate (W Gate) pulse to the decoders 28 and 30 and a terminal 36 is provided for applying a Read Gate (R Gate) pulse to the decoders 26 and 32. The decoders 26, 28, 30, 32 control respectively an R Driver 38, an R Bias and W Driver 40, an R Bias and W Driver 42, and an R Driver 44. A terminal 46 is provided for applying a Read Bias Gate (R Bias Gate) pulse to the R Bias and W Drivers 40 and 42. The R Driver 38 and the R Bias and W Driver 40 jointly control a Y Matrix Switch 48 to select and energize one of 32 Y-wires shown in FIG. 3 which in turn have a part in selecting a single register in the memory planes 20 and a single core in the Clear plane 22. The R Bias and W Driver 42 and the R Driver 44 jointly control an X Matrix Switch 50 to select and energize one of 32 X-wires shown in FIG. 3 which in turn cooperates with the selected Y-wire in selecting a desired single register and single core in the Clear plane.

Each of the seven memory planes as well as the Clear plane has a sensing wire or winding S which passes through all the cores in the respective plane. Each sensing wire is connected to an individual sense amplifier SA. The seven sense amplifiers for the memory planes are represented in FIG. 1 by a single block 52 and the sense amplifier for the Clear plane is represented by the block 54. Where a single block or line in the drawing is to be understood to represent a plurality of similar units or parallel connections respectively, the number of units or connections represented is set down in parentheses. Through suitable gating circuits not shown in FIG. 1, the outputs from the sense amplifiers 52 are connected to individual trigger-type devices in a seven-bit temporary storage register 56 while the output from the sense amplifier 54 is connected to a single trigger, specifically a status trigger 58. In general, where gating and control circuits are omitted from FIG. 1 in the interest of clarity of over-all description they are shown in detail in FIG. 6. The register 56 is designated as an Out-register for receiving information read out of memory. The seven trigger devices in the register 56 are connected respectively to seven "and" circuits represented by a block 60 and the output of the single trigger 58 is connected in parallel to the input circuits of all seven of these "and" circuits, as shown more particularly in FIG. 6. The outputs of the "and" circuits 60 are connected respectively to seven conductors in a cable 62 which may in turn be connected to the arithmetic and logic unit of a computer or to any other suitable utilization device for data or information handling. The outputs of the "and" circuits 60 are also connected respectively to a block 64 of inverters the outputs of which in turn are connected respectively to a block 66 of "and" circuits. The outputs of the respective "and" circuits 66 are connected in turn to a block 68 of "or" circuits. The outputs of the "or" circuits are connected through gating and control circuits to a block 70 of inhibit drivers which are in turn connected respectively to seven inhibit, or Z, windings of the memory 20. A Read control 72 is connected in parallel with all the input circuits of the block 66. A cable 74 for bringing in new information is connected through gating and control circuits to an In-register 76 the output of which is connected in turn to the input side of a block 78 of "and" circuits. A gate lead 80 is connected in parallel with all the input circuits of the block 78. The output of the block 78 is connected to the block 68 of "or" circuits along with the connections from the block 66.

The operation of the system of FIG. 1 will now be explained in general terms with reference to particular machine instructions which the computer is expected to carry out. First it will be assumed that the computer is instructed to Read the contents of the register at a specific memory address A and transfer the contents to the arithmetic and logical unit. In this operation, which of course is a read operation, the address A given in the instruction is stored temporarily in the memory address register 24. The address is decoded by the address decoders 26, 28, 30, 32 and the matrix switches 48, 50 are actuated by the respective drivers 38, 40 and 42, 44 to select and prepare for reading the seven memory cores and the Clear core associated with the address A. Still in the read operation and during the read portion of the memory cycle, a reading pulse is sent through the selected cores, thereby producing relatively high level output pulses in those of the sensing windings that pass through memory cores which are in the "one" state or set state as it will be called. The pulses from the sensing windings are amplified in the sense amplifiers at 52 and 54 and those triggers in blocks 56 and 58 which receive pulses are changed into the "one" or set state, it being assumed that all the triggers have initially been reset to the "zero" or reset state. The sending of the reading pulse through the selected cores effectively clears the register and also the Clear bit core, but the information content formerly stored at the memory address A is not lost as it is now temporarily stored in the register 56 and the status trigger 58.

If, now, the digit stored in the trigger 58 is a "one," the "and" circuits 60 will be conditioned so that at an appropriate time the information content of the register 56 is passed over the cable 62 to the arithmetic and logical unit of the computer. If, however, the digit stored in the trigger 58 is a "zero," the "and" circuits 60 are all disabled which in effect means that only "zeros" can be passed on to the computer. The result is as if the register at address A initially had contained only "zeros," or in other words as if the register were actually Clear.

Continuing to consider the read operation and passing to the write portion of the memory cycle, a pulse is received at an appropriate time, the information content of the register 56 is inverted in the inverters 64 and the inverted information is passed through the "and" circuits 66 and the "or" circuits 68 to the inhibit drivers 70. As a result of the inversion, for each "zero" in register 56 the associated inhibit driver sends an inhibiting current over the associated Z wire in the block 20 so that when writing pulses are applied to the selected cores in the block 20 the cores that receive an inhibiting pulse will remain in the reset state and the cores that do not receive an inhibiting pulse will be changed over into the set state. Thus, if the status bit in register 58 is a "one," the information originally contained in the register at address A will be rewritten into memory. But, if the status bit is a "zero," all the cores in the register at address A will remain in the reset state, thereby leaving the register in the actually cleared state. Since the Clear plane 22 is not provided with an inhibit driver, the writing pulse changes the selected clear plane core to the "one" state, thereby restoring the associated memory register to normal use.

Although the invention involves primarily the read operation, for completeness and clarity of description it will next be assumed that the instruction to be carried out is to receive a word of information from the computer and Write this information into a register at memory address B. While this is a Write operation, the memory cycle begins as usual with a read portion, in which the register at the address B is selected and its contents are cleared by the application of a reading pulse. As the information obtained from register B is no longer wanted, the sensing operation is not utilized, and as has been remarked above, the Clear plane and its contents have no significant effect upon the write operation. During the write portion of the memory cycle, now information is received from the computer over the cable 74 and is temporarily stored in inverted form in the register 76. Upon receipt of a gate pulse over the lead 80, the "and" circuits 78 are activated and the contents of the register 76 are transmitted through the "or" circuits 68 to the inhibit drivers 70. These drivers function with respect to the new information in exactly the same way as they do in a read operation to effect the writing of the information into the selected register in memory, it now being new information that is being written in whereas in the read operation it was old information being rewritten.

The operation of the invention in indicating a group of registers in memory as Clear without first actually clearing the individual registers of whatever information they may contain will now be explained in general terms. In this connection an instruction is given to the Clear control unit 23 to "Clear memory section 0," "Clear memory sections 0 and 1," "Clear entire memory," or other such instruction. The address is decoded and drivers are actuated in unit 23 to change to the "zero" state simultaneously all the cores in the selected sections of the Clear plane 22. Then, as will be understood from the operation of the system in the read operation explained above, when any register in the selected group is addressed in a read operation a "zero" status bit is sensed and the status trigger 58 is held in the "zero" state, thereby preventing anything but "zeros" from passing through the "and" circuits 60 to the computer and also preventing anything but "zeros" from being rewritten into the addressed register, thus leaving the register clear in actuality. In the immediately following write portion of the same memory cycle, the status bit of the addressed register will be changed to a "one," since as it will be noted there is no inhibit drive associated with the clear plane. While the "zero" status bit serves as notice to the computer not to read the contents of the register, the change to a "one" status bit removes this prohibition and restores the register to normal use.

Referring now to FIGS. 2–5, there is shown in more detail a three dimensional magnetic core memory 150 in which the Clear plane of the present invention is incorporated and which corresponds to the blocks 20 and 22 in the system of FIG. 1. Magnetic cores are utilized as the basic storage elements of the memory 150 inasmuch as they are capable of storing information by virtue of their residual magnetism.

Figure 2:
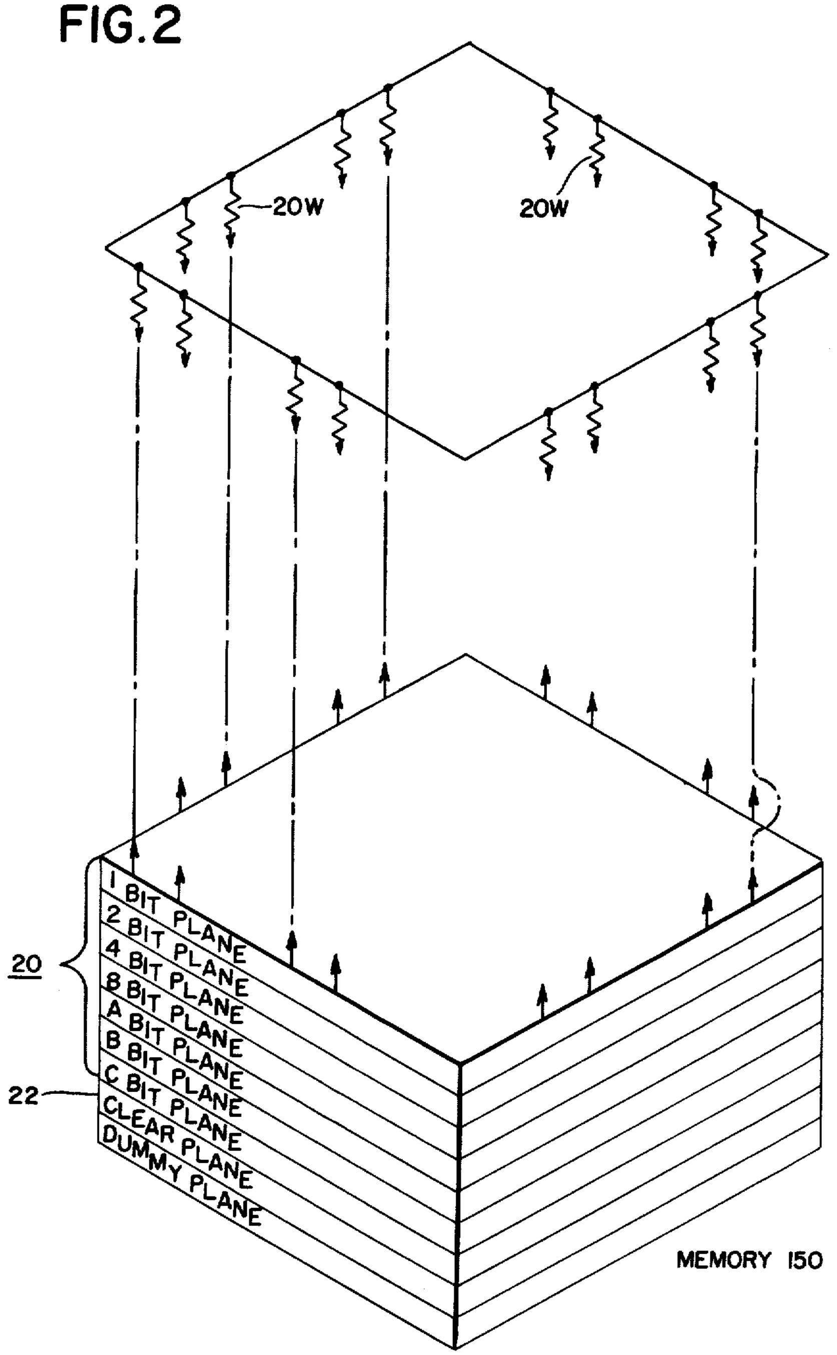
FIGS. 2 through 5 are perspective views, partly diagrammatic, showing wiring schemes in a typical memory organization embodying the invention.

The three dimensional memory 150 shown in block form in FIG. 2 is comprised of seven memory planes and the Clear plane, each of which consists of 1024 ferrite magnetic cores arranged in a 32 x 32 matrix, and a dummy plane. The seven memory planes of the memory 150 are hereinafter referred to as the C bit plane, B bit plane, A bit plane, eight bit plane, four bit plane, two bit plane and one bit plane corresponding to the seven bits of a Character of Data. Each group of seven memory cores occupying corresponding positions in the seven memory planes comprise a Storage Register for a Character and since each of the seven memory planes consist of 1024 memory cores, the memory 150 provides 1024 Storage Registers for 1024 Characters of Data. Thus, the C bits of all of the 1024 Characters are stored in the C bit plane, the B bits of all of the 1024 Characters are stored in the B bit plane, etc. The memory core occupying the corresponding position in the Clear plane 22 provides storage for a Reading Status bit which is prefixed to the corresponding Character of Data.

Each memory core in the seven planes has four wires passing therethrough, namely, an X current carrying wire, a Y current carrying wire, an inhibit current carrying wire Z and a sense wire S.

Figure 3:
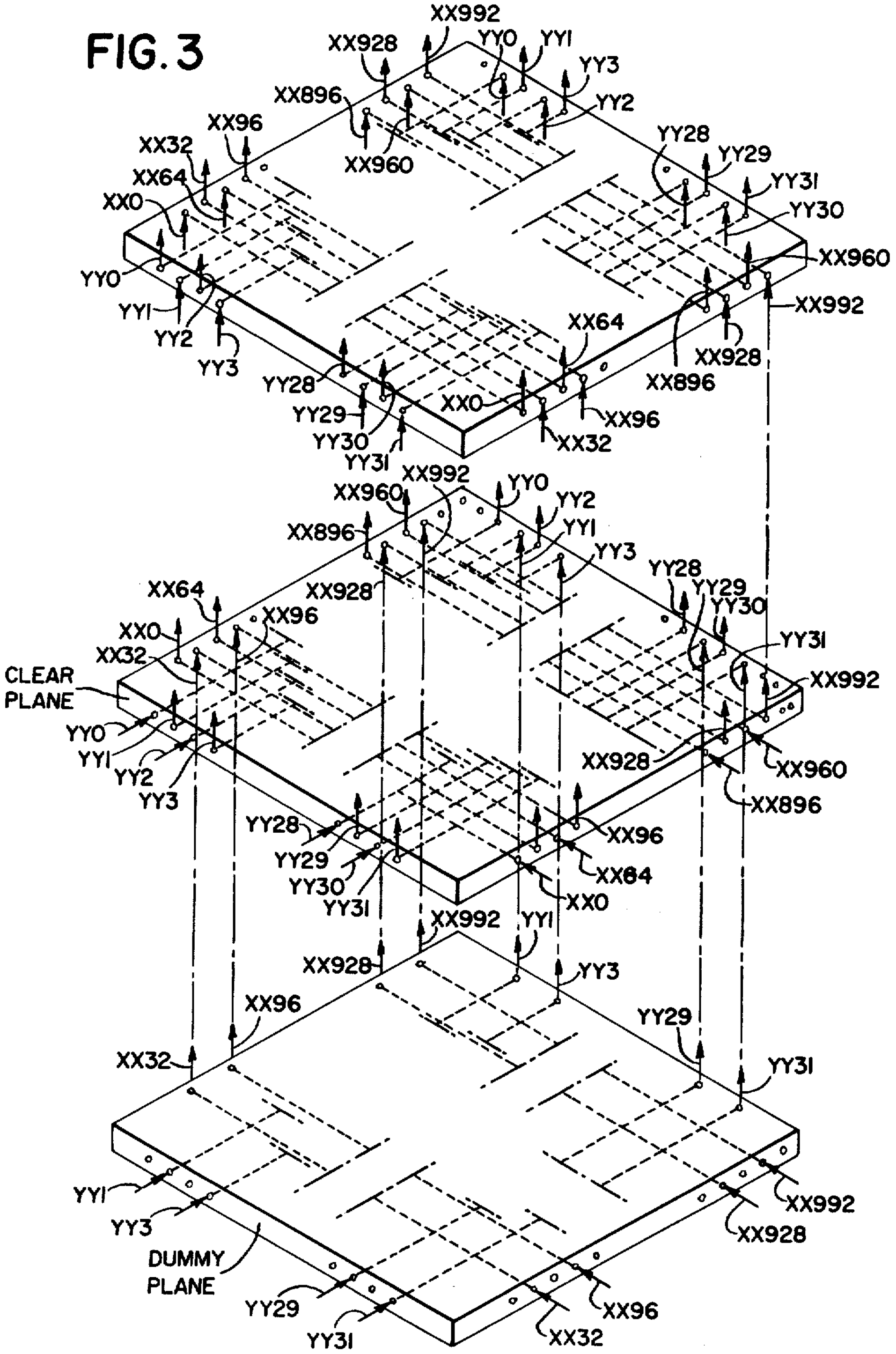

Since each memory plane and the Clear plane consists of a 32 x 32 array, provision is made for 32 separate and distinct X wires XX0, XX32, XX64 . . . XX960 and XX992 and 32 separate and distinct Y wires YY0, YY1 YY2 . . . YY30 and YY31 which run at 90° to each other, as shown in FIG. 3. Corresponding X wires in the Clear plane and in each memory plane are serially connected in such a manner that an X wire consists of a single wire passing from the Clear plane serially through the C, B, A, eight, four, two and one bit planes and then via a 20 ohm terminating registor to a floating resistor common line. Likewise, corresponding Y wires in each plane are serially connected in such a manner that a Y wire consists of a single wire passing from the Clear plane serially through the C, B, A, eight, four, two and one bit planes and then via a 20 ohm terminating resistor to the floating resistor common line. Therefore, a selected X wire and Y wire intersect at eight memory cores, occupying corresponding positions in the Clear plane and in each of the seven memory planes, which comprise the status bit register and the seven bit Storage Register for a seven bit Character of Data.

It should also be noted that alternate X and Y wires are passed via the Dummy plane before passing via the Clear plane so that the alternate X and Y wires pass in opposite directions through each core plane. Thus, for example, the YY0 wire is applied directly to the front of the Clear plane and then through from front to back whereas the YY1 wire is applied directly to the Dummy plane, then, through from front to back and up to the Clear plane and then through from back to front, etc. so that adjacent X and Y wires pass in opposite directions through each core plane. This arrangement, in combination with the floating resistor common line, permits current flowing in a selected wire to reach the floating resistor common line and then pass via the unselected wires to offset the effects of any unwanted current that may have been induced in these wires.

Figure 4:
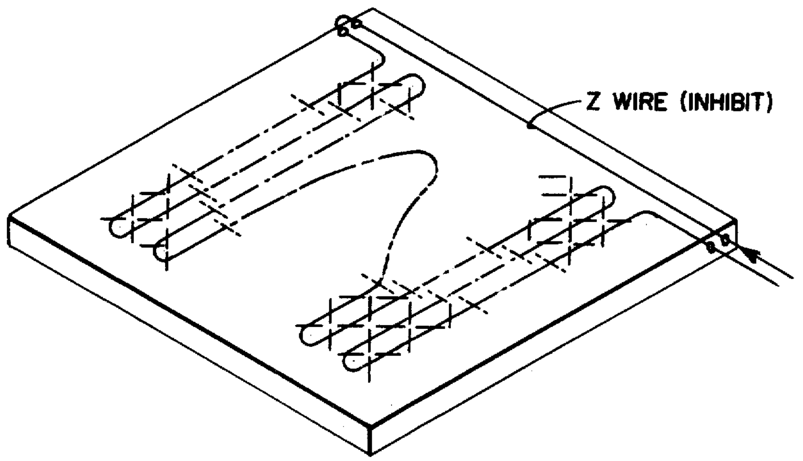

There are seven separate and distinct, that is, unconnected inhibit wires Z, one for each of the seven memory planes, arranged so that each Z wire runs parallel to the Y wires in the associated plane and passes through every core in the plane, as shown for a representative plane in FIG. 4.

Figure 5:
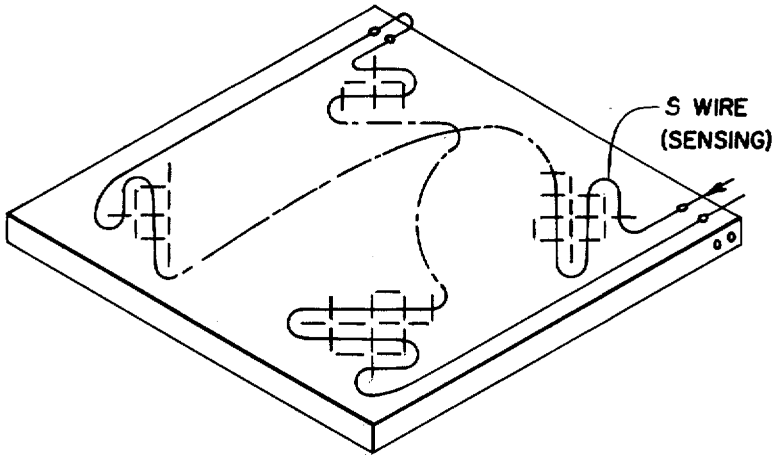

Also, there are eight separate and distinct, that is, unconnected sense wires S, one for the Clear plane and one for each of the seven memory planes, arranged so that each sense wire runs at 45° to any of the other previously mentioned wires and passes through all of the cores of its associated plane in a bipolar fashion, as shown for a representative plane in FIG. 5, that is, the sense wire enters some of the memory cores from the front and some from the back so that a change in flux causes a positive pulse to be induced in the sense wire in one case and a negative pulse in the other case. This arrangement is utilized to minimize certain effects of half select current pulses in a manner to be described hereinafter.

The flux necessary to change the state of a magnetic core can be generated by the current carried in a single wire or by two wires each carrying half the current necessary to switch the core but of such polarity as to make their fluxes additive to change the state of the core.

In the memory 150, each memory core is intersected by an X wire and a Y wire. Consequently, to change the state of a memory core, which is at the intersection of a selected X and Y wire, current pulses are coincidently applied to the selected X and Y wires. These current pulses are herein referred to as half select currents inasmuch as their magnitude is only half of that required to change the state of the core. However, the memory core which is at the point of intersection of the selected X and Y wires, receives the effects of both of the half select current pulses so that the combined flux, if in the proper direction, causes the memory core to change from its present state to the opposite state.

In selecting a Storage Register in the memory 150, all the cores on each of the selected X and Y wires are driven by the half select current pulses applied to the selected X and Y wires. Therefore, all of the memory cores, except those at the points of intersection, are caused to move through a minor hysteresis excursion or loop and, at the termination of the half select current pulses, finally reach an equilibrium state hereinafter referred to as a disturbed state. Thus, if a memory core is in the undisturbed one state, the application of a negative half select current pulse causes the core to move through a minor loop to the disturbed one state. Likewise, if a memory core is in the undisturbed zero state, the application of a positive half select current pulse causes the core to move through a minor loop to the disturbed zero state. Each of these minor loops results in flux changes which induce small but unwanted noise pulses in the sense wire S. However, since the sense wire is bipolar wound, most of these noise pulses oppose each other and tend to be cancelled out.

Reading of a memory core lying at the intersection of a selected X and Y wire is accomplished by coincidently applying negative half select current pulses to each of the selected wires. Thus, if the memory core is in the one state, indicating that a "one" bit is stored therein, the application of the half select current pulses to the selected wires causes the core to travel along the hysteresis loop to negative saturation and finally coming to rest at the zero state. The flux created by this change of state induces a relatively large pulse in the sense wire passing through the selected memory core. On the other hand, if the memory core is in the zero state, indicating that a "zero" bit is stored therein, the application of the half select current pulses to the selected wires merely causes the core to travel to negative saturation and when the pulse is past, back to the zero state. The flux created by this movement induces a relatively small pulse in the sense wire passing through the selected memory core. Therefore, it is apparent that in reading a memory core, if the state of the core is changed a relatively large pulse is induced in the sense wire, corresponding to a "one" bit, but if no change in state occurs only a relatively small pulse is induced in the sense wire, corresponding to a "zero" bit. A time sampling arrangement may be provided as hereinafter described so that only the "one" bit pulse is sampled while the zero pulse and any unwanted half select pulses which are not cancelled are ignored.

Writing a "one" bit into a memory core lying at the intersection of a selected X and Y wire is accomplished by coincidently applying positive half select current pulses to each of the selected wires. Thus, if the memory core is in the zero or cleared state, the application of the half select current pulses to the selected wires causes the core to travel along the hysteresis loop to positive saturation and finally come to rest at the "one" state thereby storing a "one" bit. The flux created by this change of state induces a pulse in the sense wire. However, during a writing operation, no sampling occurs so that pulses induced in the sense wire can be ignored. In writing a "zero" bit into a memory core, an opposing half current pulse is applied to the inhibit wire passing through the selected core. The flux created by this opposing half current pulse opposes the combined flux created by the half select current pulses applied to the selected wires so that the resultant flux causes the core to travel through a minor loop and finally coming to rest at the disturbed zero state thereby storing a "zero" bit. Again, the flux created by this minor excursion induces a pulse in the sense wire which is ignored since no sampling occurs.

The memory is generally used with a basic cycle of operation as above described which consists of a read portion and a write portion. Thus, in a memory read operation, during the read portion of the cycle, each bit of a seven bit character together with the associated status bit is read out of the memory cores, in a manner as previously described, of a selected Storage Register in the memory 150, sensed by the sense wires S, amplified by sense amplifiers, and normally transferred to a character register whereas, in a write operation during the read portion of the cycle, each bit of a seven bit character together with the associated status bit is read out of the memory cores of the selected Storage Register, and, while sensed by the sense wires S, this time there is no need for transfer to a character register. Therefore, in a write operation, the character read out during the read portion of the cycle is ignored and the operation, in effect, clears the Storage Register, so that a new character may be written therein during the next succeeding write portion of the cycle.

Also, in a read operation, in view of the destructive nature of the read-out, the character which was read out during the read portion of the cycle and transferred to a character register is normally rewritten back into the selected Storage Register during the write portion of the cycle by inhibit driving in the manner described herein whereas in a write operation, during the write portion of the cycle a new character is written into the selected Storage Register which was cleared during the read portion of the cycle.

The memory 20 of FIG. 1 consists of 1024 storage registers each of which is addressable and chosen, as explained above, by selecting one of the 32 X wires and one of the 32 Y wires of the memory 20. Consequently, means are provided to select one of the 32 X wires and one of the 32 Y wires of the memory 20 in accordance with the address of the selected Storage Register.

This selection is accomplished by using two magnetic switch core arrays, each of which consists of a two dimensional 4 x 8 matrix, namely the X switch matrix 50 and the Y switch matrix 48, of FIG. 1. A typical one of the 32 switch cores in each switch matrix consists of a magnetic core having a read winding, a write winding and an output winding. The read windings in each column of the matrices are serially connected to the output of an individual driver element comprised in the R Driver 38 or 44. Likewise, the write windings in each row of the matrices are serially connected to the output of an individual driver element comprised in the R Bias and W Driver 40 or 42. Also, one end of each of the 32 output windings of the X switch matrix 50 is connected to one of the 32 X wires of the memory 20 while the other ends of all of the output windings are connected to a floating common line. Similarly, one end of each of the 32 output windings of the Y switch matrix 48 is connected to one of the 32 Y wires of the memory 20 while the other ends of all of the output windings are also connected to the floating common line.

Here again, as in the memory 150, it is necessary to select one row in the X dimension and one column in the Y dimension of the X switch matrix 50 to uniquely select one switch core which, in turn selects one of the 32 X wires of the memory 20. Likewise, it is necessary to select one row in the X dimension and one column in the Y dimension of the Y switch matrix 48 to uniquely select one switch core which, in turn, selects one of the 32 Y wires of the memory 20. Thus, by selecting four lines, two per matrix switch, it is possible to select any combination of X and Y wire in the memory 20.

Since there are 1024 addressable Storage Registers in the memory 20, provision is made for selecting a particular X and Y wire of the memory 20 in accordance with the address of the selected Storage Register in the memory 20. Each of the 1024 addresses is represented by a ten order binary number, as for example:

| | 512 | 256 | 128 | 64 | 32 | 16 | 8 | 4 | 2 | 1 |
|---|---|---|---|---|---|---|---|---|---|---|
| Address 0000 | 0 | 0 | 0 | 0 | 0 | 0 | 0 | 0 | 0 | 0 |
| Address 0001 | 0 | 0 | 0 | 0 | 0 | 0 | 0 | 0 | 0 | 1 |
| * * | * | * | * | * | * | * | * | * | * | * |
| Address 0766 | 1 | 0 | 1 | 1 | 1 | 1 | 1 | 1 | 1 | 0 |
| * * | * | * | * | * | * | * | * | * | * | * |
| Address 1023 | 1 | 1 | 1 | 1 | 1 | 1 | 1 | 1 | 1 | 1 |

A ten order address register 24 is provided for storing the address of the Storage Register in memory 20 from which a character is to be read or in which a character is to be written.

The manner in which one of the 32 X and one of the 32 Y wires of the memory 20 is selected will now be described by way of example. Let it be assumed that the address 0766 is presently stored in the address register 24. The first five orders, 1, 2, 4, 8, 16, of the 10 order binary number stored in the address register 24, having 32 possible combinations, are used for selecting one of the 32 Y wires of the memory 20 while the last 5 orders, 32, 64, 128, 256 and 512, of the 10 order binary number, also having 32 possible combinations, are used for selecting one of the 32 X wires of the memory 20.

It will be assumed that the memory registers are numbered in such a way that the address 0766 is located at the intersection of the wires XX736 and YY30. It will also be assumed that the XX736 wire is connected to the output winding of that core in the X matrix switch 50 that is located at the intersection of the second row and eighth column; also that the YY30 wire is connected to the output winding of that core in the Y matrix switch 48 that is located at the intersection of the first row and seventh column.

In what follows, it will be assumed that all the cores in both matrix switches 48 and 50 are initially in the reset condition.

At the proper time in the read portion of a memory cycle, a positive pulse having a suitable period of say 4.5 microseconds, is applied via the R Bias Gate line 46 to the R Bias and W Drivers 40 and 42, respectively. The switch core drivers in block 40 in response thereto apply bias current on selected rows, which for the present example are the second, third and fourth rows of the Y switch matrix 48, causing all of the switch cores on each of these rows to be driven to negative saturation and leaving the cores in the first row unsaturated. The switch core drivers in block 42 respond by applying negative bias current on selected rows, which for the present example are the first, third and fourth rows of the X switch matrix 50, causing all of the switch cores on each of these rows to be driven to negative saturation and leaving the cores in the second row unsaturated.

During the 4.5 microsecond period of the positive pulse on the R Bias Gate line 46, a positive pulse is applied via the R Gate line 36 to the address decoders 26 and 32. The positive pulse on the R Gate line 36 applies a positive select current pulse to drive a selected column, in this example the seventh column, of the Y switch matrix 48. Since only one switch core in the column is in the unbiased state, namely the switch core at the intersection of the first row and seventh column, only that switch core switches from the reset to the set condition and induces a current in its output winding causing a negative half select current pulse to be applied, in this example via the YY30 wire, to the memory 20, this being the Y wire which is controlled by the switch core at the intersection mentioned. The positive pulse on the R Gate line 36 also applies a positive select current pulse to drive a selected column in this example the eighth column, of the X switch matrix 50. Since only one switch core in the column is in the unbiased state, namely, the switch core at the point of intersection of the eighth column and second row, only that switch core switches from the reset condition to the set condition and induces a current in its output winding causing a negative half select current pulse to be applied, in this example via the XX736 wire to the memory 20. Thus, it should be apparent, that the XX736 and YY30 wires are chosen in accordance with the address 0766 setting of the address register 24. During a read operation this causes a character to be read out of the memory 20 while during a write operation this effectively causes the selected storage register to be cleared in preparation for receiving a character. When the positive pulse on the R Bias Gate line 46 terminates, the bias is removed from the unselected rows of cores in the X and Y switch matrices 50 and 48, restoring these cores to the unsaturated state.

At the proper time in the write portion of a memory cycle, a positive pulse is applied to the W Gate line 34 which applies a negative current driving pulse, in this example, along the first row of the Y switch matrix 48. Since only one switch core in the first row is in the set condition, namely, the switch core at the intersection of the first row and seventh column, only that switch core is switched back from the set condition to the reset condition and induces a current in its output winding causing a positive half select current pulse to be applied via the selected YY30 wire to the memory 20.

At the same time, the positive pulse on the W Gate line 34 applies a negative current driving pulse, in this example along the second row of the X switch matrix 50. Since only one switch core in the second row is in the set condition, namely, the switch core at the intersection of the second row and eighth column, only that switch core is switched back from the set condition to the reset condition and induces current in its output winding causing a positive half select current pulse to be applied via the selected XX736 wire of the memory 20. Thus, it should be apparent, that the XX736 and YY30 lines are again selected in accordance with the address 0766 setting in the address register 24. During the normal read operation this causes a character which was previously read out to be rewritten into the seletced storage register of the memory 20 while during a write operation this effectively causes a new character to be written into the memory 20.

In a similar manner, each storage register of the memory 20 is chosen by selecting one of the 32 X wires and one of the 32 Y wires of the memory 20 in accordance with the address of the selected storage register in the memory 20.

Since the addressing of memory and the reading out or writing in of data are known processes, no more detailed description of these processes is necessary.

Figure 6:
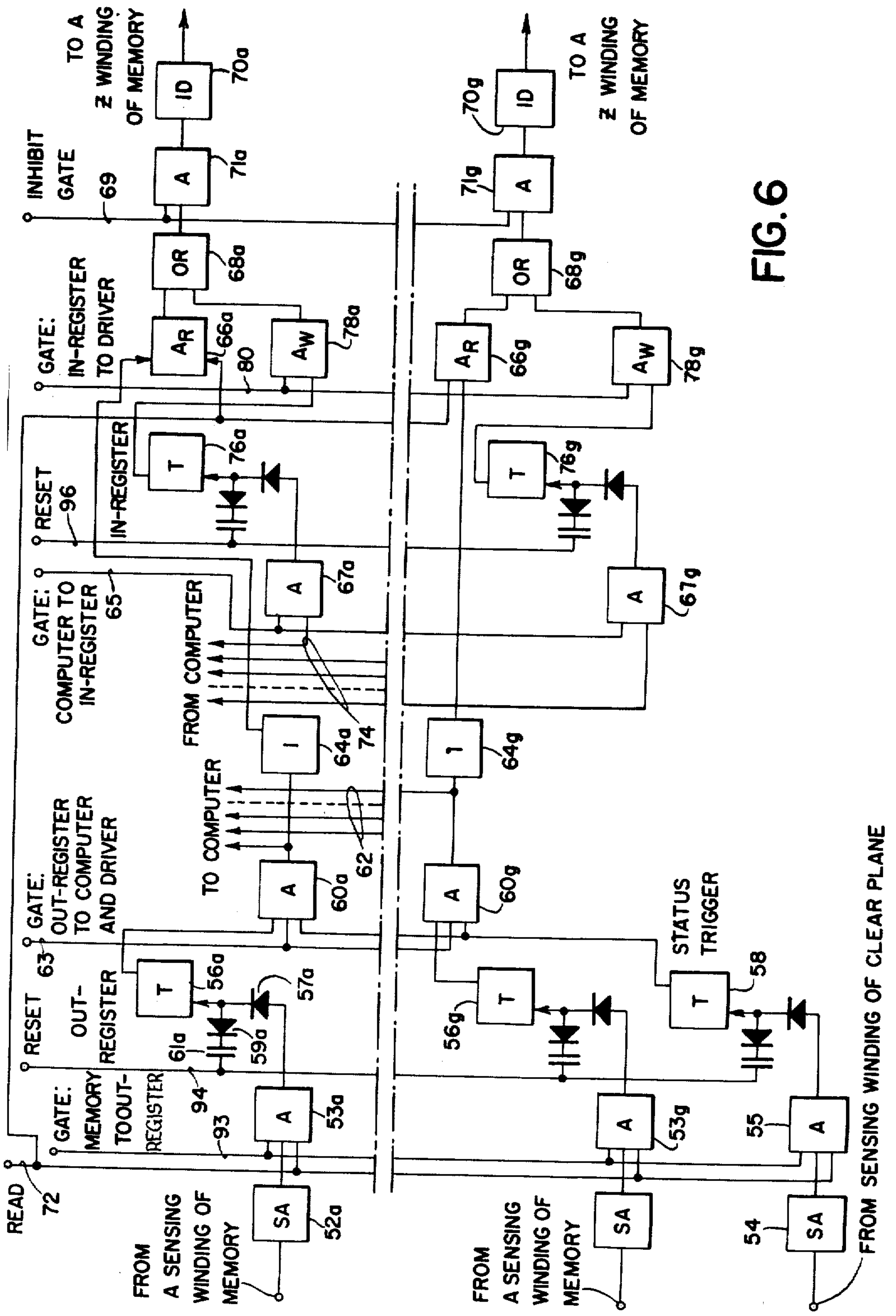
FIG. 6 is a detailed schematic diagram of a portion of a system like that shown in FIG. 1.

FIG. 6 shows in greater detail a portion of the system of FIG. 1. In FIG. 6 are indicated the individual sense amplifiers 52*a* . . . 52*g*, which are represented collectively by the block 52 in FIG. 1. Similarly, trigger circuits 56*a* . . . 56*g* are indicated corresponding to the register 56. Similarly, too, individual "and" circuits are indicated in FIG. 6 for blocks 60, 66 and 78 of FIG. 1, individual triggers for register 76, individual "or" circuits for block 68, and individual inhibit drivers for block 70, the respective reference numerals having in each case suffixes *a* . . . *g*. The cables 62 and 74 are shown schematically in FIG. 6 and connections of the R control 72 to the "and" circuits 66*a* . . . 66*g* are shown in detail as are also the connections of the gate 80 to the "and" circuits 78*a* . . .

78*g*. The sense amplifier 54 and status trigger 58 are shown, together with the detailed connection of the output of the status trigger 58 to the "and" circuits 60*a* . . . 60*g*. Re-set connections for simultaneously re-setting all of the triggers in a register are provided, comprising lead 94 for re-setting trigger 58 and the Out-register 56 comprising triggers 56*a* . . . 56*g*, and a lead 96 for re-setting the In-register 76 including triggers 76*a* . . . 76*g*.

The blocks marked A, OR, and T in FIG. 6 correspond respectively to AND circuits, OR circuits and triggers respectively; the blocks marked SA correspond to sensing amplifiers; and the blocks marked ID correspond to inhibit drivers, all of which are known per se. Illustrative forms of all of these circuits are shown in the above-mentioned application of R. A. Gregory et al., Serial No. 592,545, filed June 20, 1956. The AND circuits have the well known characteristic that the output of the circuit is energized in a prescribed state when and only when every input to the circuit is in its prescribed state. In the OR circuits, the output is energized in a prescribed state when any one or more of the inputs to the circuit is in its prescribed state. The trigger circuits have two stable states and remain in either state until caused to change to the other state by application of a prescribed signal. The sensing amplifiers may, as illustrated in the above-mentioned application, include, in addition to two stages of amplification and an output cathode follower, an initial full wave rectifier to convert the input signals to signals of the same plarity. The inhibit drivers are gate-controlled feedback current amplifiers.

Additional gating and control circuits not shown in FIG. 1 are included in FIG. 6. For example, an "and" circuit 53*a* is shown inserted between sensing amplifier 52*a* and trigger 56*a*. Similarly, "and" circuits are provided between each sensing amplifier and its associated trigger, e.g., "and" circuit 53*g* between sensing amplifier 52*g* and trigger 56*g*, and "and" circuit 55 between sensing amplifier 54 and status trigger 58. Each of the "and" circuits 53*a* . . . 53*g*, and 55 requires conditioning by a Read control pulse from lead 72 simultaneously with a gate pulse from a lead 93. Each trigger 56*a* . . . 56*g*, 58, 76*a* . . . 76*g* is provided with a conventional combined setting and resetting input circuit, comprising for example a setting diode 57*a* in the connecting lead from the output of "and" circuit 53*a* to the input of trigger 56*a*, and a serial combination of a reversely polarized diode 59*a* and capacitor 61*a* connecting the lead 94 to the input of trigger 56*a*.

An output gate 63 for out-register 56 is connected to the inputs of all the "and" circuits 60*a* . . . 60*g*. A gate 65 from computer to In-register controls a group of "and" circuits 67*a* . . . 67*g* which are interposed between the cable 74 and the triggers 76*a* . . . 76*g*. An inhibit gate 69 may also be provided, if desired, to control a group of "and" circuits 71*a* . . . 71*g* which are interposed between the "or" circuits 68*a* . . . 68*g* and the inhibit drivers 70*a* . . . 70*g*.

The operation of the system of FIG. 6 will first be explained for the case in which the selected register in memory has been indicated as Clear by virtue of a "zero" status bit stored in the Clear plane.

In a read operation, during the read portion of the memory cycle, pulses are applied to the sensing amplifiers 52*a* . . . 52*g*, and 54 over input leads from the respective sensing windings of the cores in the memory planes 20 and in the Clear plane 22. These pulses are of gently rounded wave form and depend in amplitude and in time of arrival upon whether they originate in a core that is in the "one" state or in a core that is in the "zero" state. The pulses corresponding to the "one" state are relatively strong while those corresponding to the "zero" state are relatively weak and reach their maximum amplitude slightly ahead of the stronger pulses.

A Read pulse is received over the lead 72 during a relatively long period of time comprising the time during which the sensing pulses are being received from the memory and continuing throughout a substantial portion of the entire memory cycle of the read operation. The Read pulse is applied to the "and" circuits 53*a* . . . 53*g*, and 55, and also to the "and" circuits 66*a* . . . 66*g*. At the time during the application of the Read pulse when the pulses from the cores in the "one" state are at their strongest, a relatively short gate pulse is applied over lead 93 to the "and" circuits 53*a* . . . 53*g*, and 55. If, for example, the sensing amplifier 52*a* receives a pulse from a core that is in the "one" state, a sharp pulse of relatively high potential is produced in the "and" circuit 53*a* that is suitable for setting the trigger 56*a*. If, on the other hand, the sensing amplifier 52*a* receives a pulse from a core that is in the "zero" state, the pulse is relatively weak and arrives before the gate pulse, with the result that a relatively weak pulse is produced in the "and" circuit 53*a* that is unable to set the trigger 56*a*. In either case it will be assumed that all the triggers 56*a* . . . 56*g*, and 58 have previously been reset by means of a negative pulse over the lead 94. Therefore, those triggers which receive a pulse from a core that is in the "one" state will be set and all the other triggers will remain in the reset state. As a result, the contents of the selected memory register have been transferred to and are now stored in the triggers 56*a* . . . 56*g*, and 58.

The output of the status trigger 58 is connected to the inputs of all the "and" circuits 60*a* . . . 60*g* while the outputs of the triggers 56*a* . . . 56*g* are connected individually to the respective "and" circuits. When the triggers have all had sufficient time to operate, a gate pulse is applied over the lead 63 to all the "and" circuits. This gate pulse is of sufficient duration to permit the outputs from the "and" circuits to be transmitted over the cable 62 to the computer and to permit the same outputs to be inverted and delivered to the inhibit drivers and written back into the selected memory register.

In the case now under consideration, since the status bit is a "zero," the status trigger 58 will not be set and consequently none of the "and" circuits 60*a* . . . 60*g* will be conditioned. The result is that only relatively low potentials, representing "zero" bits, are transmitted over the cable 62 to the computer and also into the inverters 64*a* . . . 64*g*. In other words, what is sent to the computer comprises only "zeros," just as if the selected memory register had previously been cleared. This is true regardless of the actual contents of the register at the time of reading out.

The relatively low potentials which are now being applied to the inverters 64*a* . . . 64*g*, produce relatively high potential outputs which are in turn impressed upon the inputs of the "and" circuits 66*a* . . . 66*g*, respectively. As these "and" circuits are now conditioned by the Read pulse on lead 72, high potential outputs from the "and" circuits are passed through the "or" circuits 68*a* . . . 68*g* and are impressed upon the inputs of the "and" circuits 71*a* . . . 71*g*.

At a suitable time during the write portion of the read operation, when X and Y pulses are being applied to the memory cores, an inhibit gate pulse is applied to the inputs of all the "and" circuits 71*a* . . . 71*g*, over the lead 69, thereby passing high potential pulses to the inhibit drivers 70*a* . . . 70*g*, respectively, and causing inhibit currents to be sent over the Z windings of all the memory cores. Consequently, all the memory cores in the selected memory register are left in the "zero" state. This means that the selected memory register has now been actually and physically cleared, and is ready for re-use.

As no inhibit driver is provided in the case of the Clear plane, a "one" bit is written into the selected core in the Clear plane during the write portion of the memory cycle, thereby removing the Clear designation from the selected memory register, and permitting normal reading out of information thereafter.

During the read operation no gate pulse is applied over lead 80 to the "and" circuits 78*a* . . . 78*g*, so that these "and" circuits are not conditioned. As a result, no new information which might arrive at this time over cable 74 and be stored in the In-register 76 can be passed to the inhibit drivers to be written into memory.

Turning now to the explanation of a write operation and still assuming that a "zero" status bit is stored in the Clear plane, there will be no application of a Read pulse to the lead 72. Consequently, during the read portion of the memory cycle, when the contents of the cores are transmitted to the sensing amplifiers, the "and" circuits 53*a* . . . 5*g*, 55 will not be conditioned and the contents of the selected register will not be passed to the Out-register. As a result, only "zeros" will be sent to the computer and to the inverters 64*a* . . . 64*g*. High potential inputs will be impressed upon the "and" circuits 66*a* . . . 66*g*, but, since no Read pulse is now applied to these "and" circuits, they will not be conditioned and no high potential pulses will be transmitted to the inhibit drivers from these "and" circuits.

New information, however, coming from the computer over the cable 74 is gated to the In-register by means of a gate pulse applied at the proper time over lead 65 to all the "and" circuits 67*a* . . . 67*g*, thereby setting such of the triggers 76*a* . . . 76*g*, as receive high potential inputs from the computer. After sufficient time has elapsed for all the triggers 76*a* . . . 76*g*, to operate, a gate pulse is applied over the lead 80, thereby passing the contents of the triggers 76*a* . . . 76*g*, in inverted form, through the "and" circuits 78*a* . . . 78*g*, and the "or" circuits 68*a* . . . 68*g*, to the "and" circuits 71*a* . . . 71*g*. It will be noted that the inversion in this case is obtained in the triggers 76 by using the output on the reset side of the trigger. When the inhibit gate pulse is applied over lead 69, those inhibit drivers that receive high potential pulses send inhibit currents to the memory cores, thereby writing into memory free from inversion the information received from the computer over the cable 74.

The operation of the system of FIG. 6 will now be explained for the case in which the status bit stored in the Clear plane is a "one."

In a read operation, the contents of the selected register in memory are read out as explained above and stored in the Out-register. But, since the status bit is now a "one", the "and" circuits 60*a* . . . 60*g*, are conditioned and when the gate pulse is applied over the lead 63, the contents of the Out-register are transmitted over the cable 62 to the computer. Such of the triggers 56*a* . . . 56*g*, as have been set pass a high potential through the associated "and" circuit to the respective inverter 64*a* . . . 64*g*, while those triggers which are in the reset condition pass a low potential to the respective inverter. The information content of the selected memory register is impressed in inverted form upon the "and" circuits 66*a* . . . 66*g*. Since these "and" circuits are conditioned by the Read pulse over lead 72, the inverted information is passed via the "or" circuits 68*a* . . . 68*g*, to the "and" circuits 71*a* . . . 71*g*, and then when the inhibit gate pulse is applied over lead 69, the inhibit drivers 70*a* . . . 70*g*, are energized to rewrite the information, free from inversion, back into memory. While the inhibit gate pulse is being applied, the status bit "one" is written back into the Clear plane.

In a write operation, it makes no difference whether the status bit is a "one" or a "zero" because in either case the original contents of the selected memory register are physically cleared and new information is written in its place.

Figure 7:
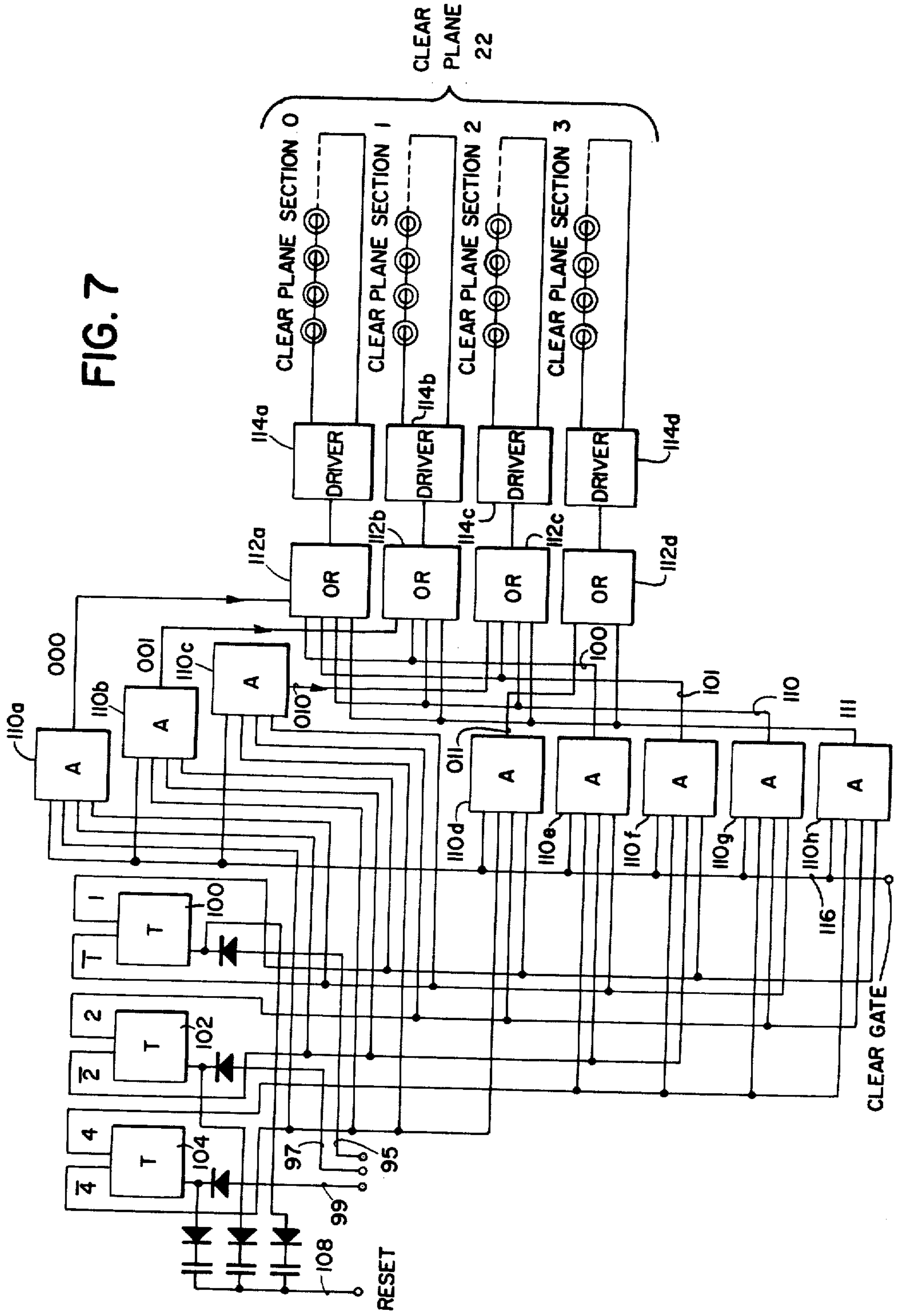
FIG. 7 is a schematic diagram of an illustrative arrangement for selecting particular sections of memory the statuses of which are to be indicated in accordance with the invention.

FIG. 7 shows an illustrative example of an arrangement for selecting one or more blocks of registers in memory which it is desired to indicate as having a clear status. The figure includes a simple type of address register addressable over input leads 95, 97, 99, a simple form of decoding and driving system and a schematic representation of a sectionalized Clear plane 22. The address register comprises a one bit trigger 100, a two bit trigger 102 and a four bit trigger 104. The clear plane 22 is shown as divided into four sections, 0, 1, 2 and 3. The three triggers provide a total of eight combinations which may, for example, be used according to the following code:

| Address | Clear Memory Sections |
|---|---|
| 000 | 0 |
| 001 | 1 |
| 010 | 2 |
| 011 | 3 |
| 100 | 0 and 1 |
| 101 | 0 and 2 |
| 110 | 0, 1 and 2 |
| 111 | 0, 1, 2 and 3 |

A re-set lead 108 is provided which is connected in parallel to the input terminals of all the triggers.

The decoding and driving system comprises a plurality of "and" circuits 110*a* . . . 110*h*. The "and" circuits are connected in various combinations to "or" circuits 112*a*, 112*b*, 112*c*, 112*d*, which in turn are connected to drivers 114*a*, 114*b*, 114*c*, 114*d*, respectively. The output of each driver is connected to a wire that passes through each core in a particular one of the sections of the clear plane.

The 1 output of the trigger 100 is connected to an input terminal of each of the "and" circuits 110*b*, 110*d*, 110*f* and 110*h*. The $\bar{1}$ output of this trigger is similarly connected to the "and" circuits 110*a*, 110*c*, 110*e* and 110*g*. The 2 output of the trigger 102 is similarly connected to the "and" circuits 110*c*, 110*d*, 110*g* and 110*h* while the $\bar{2}$ output is so connected to the "and" circuits 110*a*, 110*b*, 110*e* and 110*f*. The 4 output of the trigger 104 is connected to "and" circuits 110*e*, 110*f*, 110*g* and 110*h*, while the $\bar{4}$ output is connected to "and" circuits 110*a*, 110*b*, 110*c* and 110*d*. A lead 116 is provided for applying a "Clear gate" pulse to all the "and" circuits simultaneously.

In the operation of the system of FIG. 7, suppose for example, that after the triggers have been cleared by means of a pulse delivered over the lead 108, the code address 000 is applied to the terminals 95, 97, 99. This input leaves triggers 100, 102, 104 in the reset condition, applying high level inputs to three input terminals of "and" circuit 110*a*. None of the other "and" circuits receives as many as three high level inputs. Then, when a gate pulse is applied to lead 116, "and" circuit 110*a* alone responds, sending a pulse through the "or" circuit 112*a* to driver 114*a* which in turn sends an amplified pulse through all the cores in section 0 of the clear plane, which pulse is arranged to be in the proper polarity to change the cores to the "zero" state, thus indicating that this section of memory is to be treated as clear. If it is desired to indicate that the entire memory is clear, the code address 111 is applied, thereby setting all three triggers and conditioning "and" circuit 110*h* only. The output of "and" circuit 110*h* is transmitted to all the drivers 114*a* through 114*d* and thus clears all the cores in the clear plane. If it is desired to clear sections 0 and 1 only, the code address 100 is applied, thereby setting trigger 104 only and conditioning "and" circuit 110*e* only and energizing drivers 114*a* and 114*b*. Similarly, other single sections or combinations of sections in the memory may be cleared by using appropriate code addresses.

While all the memory planes might be wired so that the drivers 114*a*, 114*b*, 114*c*, or 114*d* might physically clear all the cores in all the registers in the selected groups, the amount of wiring and the driving power required would generally be excessive and uneconomical. The invention accomplishes the desired over-all effect in an economical way by what may be trmed "logical clearing" in place of physical clearing.

It will be understood that the invention may be applied to systems of information handling which have other numbers of core planes or other numbers of registers in the memory than are assumed in the embodiment illustrated herein. The invention may also be employed in systems other than those having memory structures of the three-dimensional stacked type, if there is provided a suitable means of simultaneously changing the content of large numbers of status bit registers. It will be evident that the division of the memory structure into sections or into groups of registers may be made in any desired manner and need not comprise groups of consecutively numbered registers or registers having consecutive address numbers.

While it is advantageous to use the digit "zero" to indicate a register which is to be treated as cleared, a digit "one" may be used instead, in which case the digit "zero" will indicate the absence of such a status.

While an illustrative form of apparatus and a method in accordance with the invention have been described and shown herein, it will be understood that numerous changes may be made without departing from the general principles and scope of the invention.

What is claimed is:

1. In an information-handling system, in combination, a plurality of registers for storing information, each said register comprising means for storing a plurality of bits representing the information to be stored together with a status bit indicating a "May Read" status or a "Don't Read" status associated with the information stored, sensing means for sensing each bit associated with a given selected register including said status bit, means controlled by the sensed character of said status bit for selectively transmitting or blocking the transmission of the sensed information content of the selected register, and means for setting substantially simultaneously the status bits of a group of registers to indicate a "Don't Read" status regardless of the actual information content of the individual storage registers of said group.

2. In an information-handling system, in combination, a plurality of digital registers for storing information in digital form, means for storing a status digit in addition to the other digits stored in each said register for indicating by said status digit the clear status or otherwise of the associated register, sensing means for sensing each digit associated with any given selected register including said status digit associated therewith, means controlled by the sensed value of said status digit for selectively transmitting the sensed information content of the selected register or for reducing the said sensed information content of the selected register to all zero digits, means controlled by said reducing means for substituting all zero digits in the given selected register in place of the information originally contained therein, and means for selectively setting a predetermined group of said status digit storing means to indicate a clear status regardless of the actual information content of the associated digital registers.

3. Apparatus according to claim 2, together with means operative substantially concurrently with said reducing means for changing the value of the said status bit to a value indicating the removal of the said clear status.

4. Apparatus according to claim 2, in which a sensed value of "zero" for the status digit controls the said transmitting or reducing means to reduce the said sensed information content of the selected register to all zero digits.

5. In an information-handling system, in combination, a plurality of digital register elements for storing the respective digits associated with a given item of information, an additional digital register element for storing a status digit associated with said first-mentioned register, individual sensing means associated with each said register including the register containing said status digit, temporary storage means individual to each said register element, individual "and" circuits one associated with each of the said temporary storage means for said digits of the given item of information exclusive of the said status digit, and parallel connecting means from the output of the temporary storage means associated with the said status digit to the inputs of all the said "and" circuits, whereby the value of the said status digit determines the operation or non-operation of all of said "and" circuits to transmit or to block the transmission of the sensed information content of the digital register elements associated with the given item of information.

6. In an information-handling system, in combination, a plurality of memory registers each comprising one or more digit registering elements for storing information in digital form and an additional digit registering element for storing a status bit associated with the information stored in said first-mentioned digit registering element or elements, means to select one of said plurality of memory registers, sensing means individual to each digit registering element of a selected memory register, temporary digit storing means individual to each said sensing means, individual "and" circuits for those of said temporary digit storing means that are associated with an information digit of information contained in the selected memory register, means connecting the output of that temporary digit storing means which is individual to the sensing means for the status digit to the inputs of all the said "and" circuits, whereby the said "and" circuits are all under the control of the temporary digit storing means that is individaul to the said status bit.

References Cited in the file of this patent

UNITED STATES PATENTS

| | | |
|---|---|---|
| 2,549,071 | Dusek | Apr. 17, 1951 |
| 2,817,072 | Kun Li Chien | Dec. 17, 1957 |
| 2,853,698 | Nettleton | Sept. 23, 1958 |
| 2,954,166 | Eckdahl | Sept. 27, 1960 |

UNITED STATES PATENT OFFICE

CERTIFICATE OF CORRECTION

Patent No. 3,108,256 October 22, 1963

Werner Buchholz et al.

It is hereby certified that error appears in the above numbered patent requiring correction and that the said Letters Patent should read as corrected below.

Column 1, line 60, for "indicating" read -- indication --; column 5, line 69, after "control" insert -- lead --; column 7, line 6, for "now" read -- new --; column 8, line 1, after "seven" insert -- memory --; column 13, line 30, for "plarity" read -- polarity --; column 14, line 5, for "the "'and" circuits" read -- the "and" circuits --; column 15, line 13, for "5g" read -- 53g --; column 17, line 1, for "trmed" read -- termed --.

Signed and sealed this 21st day of April 1964.

(SEAL)
Attest:

ERNEST W. SWIDER
Attesting Officer

EDWARD J. BRENNER
Commissioner of Patents